Oct. 17, 1950      L. B. BLACK      2,526,322
CLAMP
Filed Nov. 2, 1948
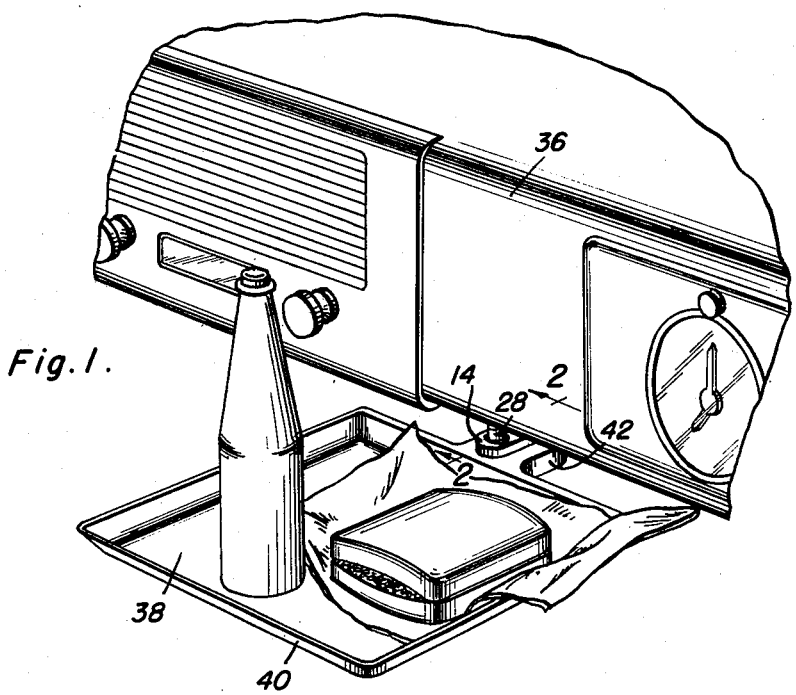
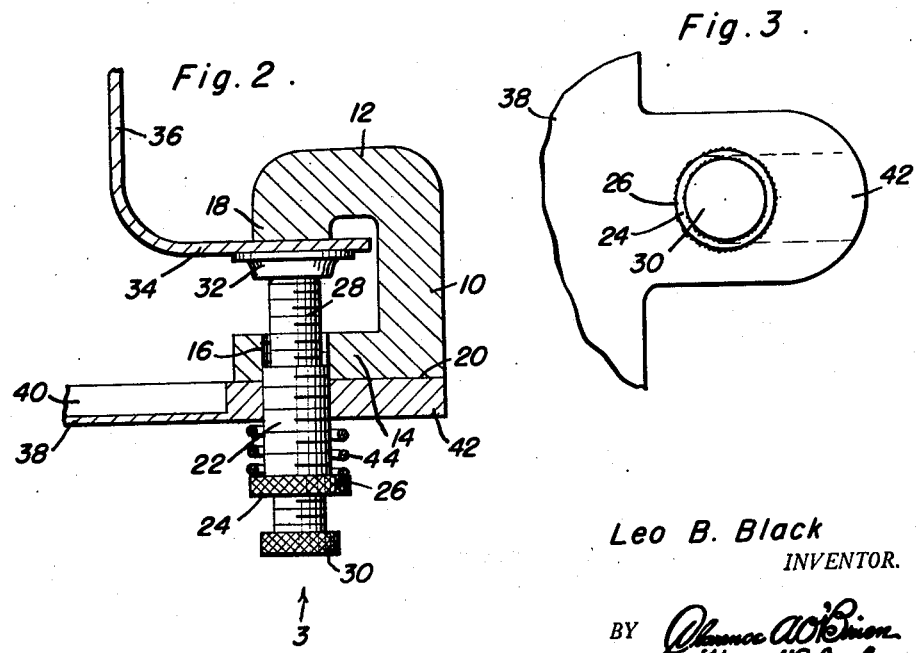
Leo B. Black
INVENTOR.

Patented Oct. 17, 1950

2,526,322

UNITED STATES PATENT OFFICE 2,526,322

CLAMP

Leo B. Black, Phoenix, Ariz.

Application November 2, 1948, Serial No. 57,936

2 Claims. (Cl. 248—226)

This invention relates to new and useful improvements in serving trays and the primary object of the present invention is to provide a utility tray and embodying novel and improved means for anchoring the same to the inturned, substantially horizontal, flanged portion of a vehicle dash panel.

Another important object of the present invention is to provide a serving tray for vehicles including a clamp detachably mounted on a vehicle dash panel, a shelf pivotally supported on the clamp, and novel and improved means for yieldingly maintaining said shelf in a selected pivoted position and resiliently supporting the shelf.

A further object of the present invention is to provide a utility tray for vehicles that is quickly and readily applied to a vehicle dash panel or removed therefrom in a convenient manner and which is normally disposed behind the dash panel when not in use to occupy very little space.

A still further aim of the present invention is to provide a serving tray of the aforementioned character that is simple and practical in construction, extremely neat and attractive in appearance, strong and durable in use, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of a vehicle dash panel and showing the present invention applied thereto for use;

Figure 2 is an enlarged, fragmentary, vertical sectional view taken substantially on the plane of section line 2—2 of Figure 1; and Figure 3 is a bottom plan view taken substantially in the direction of arrow numbered 3 in Figure 2.

Referring now to the drawings in detail, wherein for the purpose of illustration, there is disclosed a preferred embodiment of the present invention, the numeral 10 represents a substantially U-shaped member or clamp body having an upper leg portion 12 and a lower leg portion 14.

The lower leg portion 14 is provided with an internally threaded opening 16 that opposes a flat bearing surface 18, integrally formed with the upper leg portion 12, and which is spaced parallel to the flat outer surface 20 of the lower leg portion 14 for a purpose which will later be more fully apparent.

Receivably engaging the threaded opening 16, is an externally threaded sleeve 22 having a lower flanged portion or annular shoulder 24 at its lower end, and the shoulder 24 is provided with a knurled outer surface 26 facilitating a convenient gripping thereof.

The sleeve 22 is internally threaded and receivably engages a clamping bolt or screw 28 having a knurled surfaced head portion 30 at its lower terminal and a pressure plate or foot 32 at its upper terminal that cooperates with the bearing surface 18 to clamp the inturned, substantially horizontal, flange 34 of a vehicle dash panel 36 between the bearing surface 18 and pressure foot 32. The pressure foot 32 is secured to the screw 28 in any suitable manner, such as a swivel connection, and the pressure foot is constructed of any suitable material such as rubber or plastic to prevent the same from marring or scratching the finish of the flange 34 and to prevent movement of the member 10 relative to the dash panel once the same has been applied as shown in Figures 1 and 2.

The numeral 38 represents a serving tray or shelf having an upstanding marginal flange 40. An attaching ear or eye 42 projects outwardly from one end of the shelf 38 and receives the sleeve 22 for pivotal or swinging movement of the tray or shelf relative to the member 10 and dash panel 36.

A coil spring 44 embraces the sleeve 22 and is biased between the shoulder 24 and the undersurface of the eye 42 to urge the upper surface of the eye 42 against the bearing surface 20 and thereby yieldingly retain the shelf in a selected rotated position.

By adjusting sleeve 22, the shelf can be locked in a selected pivoted position and the spring 44 will also cushion the movement of the tray when the vehicle is in motion.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A serving tray for vehicles comprising a substantially U-shaped member including upper and lower leg portions, an internally threaded opening provided in the lower leg portion of said U-shaped member, an externally threaded sleeve receivably engaging the opening and having a flange at one end thereof, a shelf having an outwardly projecting eye receiving said sleeve and mounted for horizontal swinging movement on said sleeve, a spring embracing said sleeve and biased between said flange and said eye for urging said eye toward said member and against one leg of said member, and means for retaining said member relative to a supporting structure, said spring yieldingly retaining said shelf in a selected horizontally swung position, and resiliently supporting said tray.

2. A serving tray for vehicles comprising a substantially U-shaped member including upper and lower leg portions, an internally threaded opening provided in the lower leg portion of said U-shaped member, an externally threaded sleeve receivably engaging the opening and having a flange at one end thereof, a shelf having an outwardly projecting eye receiving said sleeve, a spring embracing said sleeve and biased between said flange and said eye for urging said eye toward said member and against one leg of said member, said sleeve being internally threaded, a clamping screw receivably engaging the internal threads of said sleeve, and a pressure foot mounted on said screw and cooperating with the upper leg portion of said member to clamp the member relative to a supporting structure.

LEO B. BLACK.

REFERENCES CITED

The following references are of record in the file of this patent:

UNITED STATES PATENTS

| Number | Name | Date |
|---|---|---|
| 359,833 | Basinger | Mar. 22, 1887 |
| 986,464 | Jack | Mar. 14, 1911 |
| 1,703,059 | Carpenter | Feb. 19, 1929 |
| 1,749,491 | Kokay | Mar. 4, 1930 |
| 1,801,637 | Nichols | Apr. 21, 1931 |
| 1,870,109 | Goforth | Aug. 2, 1932 |
| 2,408,801 | Miller | Oct. 8, 1946 |